US012674461B2

(12) United States Patent
Brisenheim et al.

(10) Patent No.: US 12,674,461 B2
(45) Date of Patent: Jul. 7, 2026

(54) METHOD AND FAN SYSTEM FOR DETERMINATION OF A CURRENT OPERATING POINT OF A FAN UNIT

(71) Applicant: EBM-PAPST MULFINGEN GMBH & CO. KG, Mulfingen (DE)

(72) Inventors: Erik Brisenheim, Segeltorp (SE); Stefan Hess, Dortmund (DE); Sven Fielsch, Wuppertal (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 171 days.

(21) Appl. No.: 18/015,437

(22) PCT Filed: Jun. 23, 2021

(86) PCT No.: PCT/EP2021/067085
§ 371 (c)(1),
(2) Date: Jan. 10, 2023

(87) PCT Pub. No.: WO2022/008241
PCT Pub. Date: Jan. 13, 2022

(65) Prior Publication Data
US 2023/0272799 A1 Aug. 31, 2023

(30) Foreign Application Priority Data
Jul. 10, 2020 (DE) ..................... 10 2020 118 251.1

(51) Int. Cl.
*F04D 25/06* (2006.01)
*F04D 27/00* (2006.01)
*H02P 23/14* (2006.01)

(52) U.S. Cl.
CPC ............. *F04D 25/06* (2013.01); *F04D 27/00* (2013.01); *H02P 23/14* (2013.01); *H02P 2205/03* (2013.01)

(58) Field of Classification Search
CPC ...... F04D 27/001; F04D 27/004; F04D 25/06; F04D 25/08; F04D 27/00; F04D 29/281;
(Continued)

(56) References Cited

U.S. PATENT DOCUMENTS

| | | | |
|---|---|---|---|
| 5,655,616 A | 8/1997 | Witt et al. | |
| 6,241,463 B1 * | 6/2001 | Bahner | ................. F04D 27/001 |
| | | | 417/30 |

(Continued)

FOREIGN PATENT DOCUMENTS

| | | | |
|---|---|---|---|
| CN | 103223275 A | 7/2013 | |
| CN | 208247920 U * | 12/2018 | ........... B60H 3/0616 |

(Continued)

OTHER PUBLICATIONS

English translation of CN-208247920-U and original document (Year: 2025).*

(Continued)

*Primary Examiner* — Dominick L Plakkoottam
(74) *Attorney, Agent, or Firm* — CANTOR COLBURN LLP

(57) ABSTRACT

A method and a ventilator system designed to carry out the method. The method is used to ascertain a current operating point of a ventilator unit having a ventilator and at least one filter. By determining the current operating point, a conclusion can also be drawn regarding the degree of clogging of the filter. It can also be identified whether the filter is present or not. At multiple points in time, a power value for the electrical power of the ventilator can be ascertained. In accordance with the current speed of the ventilator, a power characteristic curve can be selected from a characteristic map or calculated on the basis of a reference characteristic curve which describes the relationship between the electrical power of the ventilator and the pressure differential of the (Continued)

ventilation unit. The power characteristic curve therefore does not only relate to the ventilator but rather to the entire ventilator unit. This allows clear and sufficiently precise determination of the current operating point A of the ventilator unit.

18 Claims, 3 Drawing Sheets

(58) Field of Classification Search
CPC .. Y02B 30/70; B01D 46/0086; B01D 46/444; B01D 2273/30; B01D 46/44; F05D 2270/301; F05D 2270/3015; F05D 2270/3061; B60H 2003/0683; B60H 3/0616; H02P 2205/03; H02P 23/14; H02P 6/08
See application file for complete search history.

(56) References Cited

U.S. PATENT DOCUMENTS

| | | | | |
|---|---|---|---|---|
| 6,462,494 | B1 * | 10/2002 | Schone | F04D 27/004 |
| | | | | 417/42 |
| 6,647,320 | B1 | 11/2003 | Inoue | |
| 7,244,106 | B2 * | 7/2007 | Kallman | G05D 7/0676 |
| | | | | 417/44.1 |
| 8,346,507 | B2 | 1/2013 | Shahi et al. | |
| 8,672,733 | B2 | 3/2014 | Chen et al. | |
| 9,200,995 | B2 | 12/2015 | Ahola et al. | |
| 11,486,405 | B2 * | 11/2022 | Kammerer | F04D 27/001 |
| 11,846,292 | B2 | 12/2023 | Götzinger et al. | |
| 2003/0052791 | A1 * | 3/2003 | Reinhardt | B60H 3/0616 |
| | | | | 454/158 |
| 2003/0070544 | A1 * | 4/2003 | Mulvaney | B01D 46/44 |
| | | | | 96/417 |
| 2005/0247194 | A1 | 11/2005 | Kang et al. | |
| 2013/0197826 | A1 * | 8/2013 | Ahola | B01D 46/0086 |
| | | | | 702/44 |
| 2020/0030732 | A1 * | 1/2020 | Wystup | B01D 46/44 |
| 2021/0270478 | A1 | 9/2021 | Steckenborn et al. | |
| 2021/0372417 | A1 * | 12/2021 | Eberle | F04D 27/001 |

FOREIGN PATENT DOCUMENTS

| | | |
|---|---|---|
| CN | 109296558 A | 2/2019 |
| DE | 4329346 A1 | 8/1994 |
| DE | 60016684 T2 | 6/2005 |
| DE | 102013204135 A1 | 9/2014 |
| DE | 102015012462 B3 | 3/2017 |
| DE | 102018117514 A1 | 1/2020 |
| DE | 102018211869 A1 | 1/2020 |
| EP | 2620202 A1 | 7/2013 |
| WO | 2019166448 A1 | 9/2019 |

OTHER PUBLICATIONS

English Translation of International Search Report; Dated Sep. 23, 2021; International Application No. PCT/EP2021/067085, Filed Jun. 23, 2021; 3 pages.

International Search Report; Dated Sep. 23, 2021; International Application No. PCT/EP2021/067085, Filed Jun. 23, 2021; 4 pages.

Written Opinion (non-English); Dated Sep. 23, 2021; International Application No. PCT/EP2021/067085, Filed Jun. 23, 2021; 6 pages.

Office Action (non-English) dated Mar. 5, 2021; German Application No. 10 2020 118 251.1, Filed Jul. 10, 2020; 6 pages.

Office Action (non-English) dated Dec. 5, 2024; European Patent Application No. 21742726.9; Application Filing Date Jun. 23, 2021 (8 pages).

Chinese Office Action corresponding to CN Application No. 202180048242.6; Issue date, Dec. 8, 2025, 6 pages.

* cited by examiner

METHOD AND FAN SYSTEM FOR DETERMINATION OF A CURRENT OPERATING POINT OF A FAN UNIT

CROSS REFERENCE TO RELATED APPLICATIONS

This application is a National Stage of PCT Application No. PCT/EP2021/067085 filed on Jun. 23, 2021, which claims priority to German Patent Application No. 10 2020 118 251.1 filed on Jul. 10, 2020, the contents each of which are incorporated herein by reference thereto.

TECHNICAL FIELD

The present disclosure refers to a method and a device for determination of a current operating point of a fan unit. The fan unit comprises a fan and at least one filter. The fan is configured to create an airflow through the at least one filter. For example, thereby a flow resistance change along a flow path can be determined in which the fan unit is arranged, particularly for determination of a condition of the at least one filter of the fan unit.

BACKGROUND

Due to changes in the flow path that may occur upstream or downstream the fan unit, the flow resistance for the airflow created by the fan may change. For example, a flow resistance change may be created by changing of a flow cross-section for the airflow upstream or downstream of the fan, e.g. if an inflow opening or an outflow opening is enlarged or reduced. A flow resistance change can also be created based on the accumulation of particles on the at least one filter occurring over time. The atmosphere of the environment can be loaded with particles. Over time particles carried by the airflow can be captured by the filter. The ability of the filter to allow an airflow passing through it with a desired volume flow rate thereby diminishes. Therefore, the filter has to be cleaned or exchanged from time to time.

EP 2 620 202 B1 describes a method and a device for monitoring an air filter condition. Thereby a motor of a fan is controlled by means of a frequency converter. From the operation of the frequency converter the torque and the speed are determined and the frequency converter estimates the mechanical power of the fan based thereon. For the fan characteristic curves are determined that define a correlation between the mechanical power and the through-flow rate. Depending on the characteristic curves, the mechanical power and the speed the current operating point is then determined, from which the through-flow rate results. Therefrom a current value of an operating parameter can be determined, e.g. a dynamic flow resistance or a specific fan power. If this operating parameter is compared with an initial value of the operating parameter in case of a non-contaminated filter, a measure for the contamination of the filter can be derived therefrom.

In US 2003/0052791 A1 it is proposed to monitor the condition of a filter by means of a sensor that detects the volume flow rate of the airflow through the filter. The drawback is that an additional volume flow sensor has to be provided at the filter.

U.S. Pat. No. 8,672,733 B2 describes a method in which a fan is feedback-controlled in order to consider changes in the airflow and to compensate a partial clogging of a filter, for example.

A system and a method for determination of a condition of a filter is known from US 2003/0070544 A1. There the speed and the motor current of a fan motor are evaluated in order to recognize the load condition of a filter with particles. Depending on the motor current, it can be indicated whether the condition of the filter is still acceptable or not.

It is known from US 2005/0247194 A1 to predict a filter condition based on a model. For this purpose a resistance is determined that the filter opposes to the airflow. Based on this resistance a determination characteristic is identified in order to then determine the current condition of the filter and the remaining lifetime. The determination characteristic can be compared with a threshold value, for example, and in case of exceedance of the threshold, a clogged filter can be concluded. The determination characteristic considers the time-dependent progress of the determined resistance values and can be, for example, an average value of multiple individual resistance values.

DE 10 2015 012 462 B3 describes a method and a device for sensorless feedback control of a fan. Thereby the use of a pressure sensor and a volume flow rate sensor shall be avoided. The motor is operated in a pre-defined operating point for a motor control parameter. The motor control parameter is detected in order to determine whether a deviation from a desired value is present. If this is the case, the system is operated in a different operating point. The operating points are thereby changed iteratively until the deviation between the desired value and the current value for the motor control parameter is sufficiently small.

U.S. Pat. No. 8,346,507 B2 evaluates the time-dependent change of a power in a fan system. Depending on the gradient of the power, a distinction can be made whether a flap has been closed in the flow channel, whether a cooling coil in the cooling system has frozen or whether a filter is clogged. Based on different gradient values of the power depending on the time the different conditions can be distinguished from one another and thus can be identified.

BRIEF SUMMARY

Starting from the known prior art it can be considered as object of the present disclosure to provide a simple and exact method for determination of a condition of a filter in a fan unit and to provide a fan system configured for this purpose.

Disclosed is a method for determination of an operating point of a fan unit that includes at least one filter and a fan, wherein the method includes the following steps: creation of an airflow through the at least one filter by means of the fan, determination of one power value of electrical power of the fan at at least one point of time, determination or selection of a power characteristic curve of the fan unit, wherein the power characteristic curve characterizes a correlation between the electrical power of the fan and a flow parameter of the fan unit, wherein the power characteristic curve comprises an ambiguous power value range in which two possible flow parameter values are assigned to the one power value, and determination of a current operating point of the fan unit at least in the ambiguous power value range depending on a first power value of electrical power at a first point in time, a second power value of the fan at a second point in time and the power characteristic curve.

Also disclosed is a fan system including at least one fan unit and an external computing unit that is communicatively connected with the at least one fan unit that comprises at least one filter and a fan, wherein the fan system is configured to carry out a method for determination of an operating point of the at least one fan unit, wherein the method includes the following steps: creation of an airflow through the at least one filter by means of the fan, determination of one power value of electrical power of the fan at at least one point of time respectively, determination or selection of a power characteristic curve of the fan unit, wherein the power characteristic curve characterizes a correlation between the electrical power of the fan and a flow parameter of the fan unit, wherein the power characteristic curve comprises an ambiguous power value range in which two possible flow parameter values are assigned to the one power value, and determination of a current operating point of the fan unit at least in the ambiguous power value range depending on a first power value at a first point in time, a second power value at a second point in time and the power characteristic curve.

The present disclosure provides a method and a fan system for carrying out the method. The method is configured to determine a flow resistance change of a flow path in which a fan unit is arranged. The fan unit comprises a fan and at least one filter. The fan is particularly configured as backward curved centrifugal fan. In an embodiment the at least one filter is arranged upstream of the fan in an inflow channel. A housing of the fan unit can limit the inflow channel as well as an outflow channel arranged downstream of the fan.

The fan unit comprises in addition a fan control that is configured to control an electric motor of the fan in open loop or closed loop control. The fan control can be in communication connection with at least one sensor as an option in order to determine a current operating condition of the fan, e.g. the current speed of the fan. The current speed of the fan can be the speed of a fan impeller of the fan and/or the speed of a rotor of an electric motor of the fan. Preferably, the fan impeller is connected with the rotor of the electric motor in a torque-proof manner so that the speed of the rotor of the electric motor is equal to the speed of the fan impeller.

By means of the fan an airflow is created in a flow chamber and through the at least one filter of the fan unit. Particularly, the fan of the fan unit is a backward-curved centrifugal fan. In this type of fan the fan impeller has fan blades that are curved backward with reference to the rotation direction. Each fan blade has an inner edge and an outer edge, whereby in radial direction relative to the rotation axis the inner edge is arranged closer to the rotation axis than the outer edge. With relation to the rotation direction the outer edge is arranged behind the inner edge of the fan blade.

The fan unit has a power characteristic curve for each speed of the fan characterizing the correlation between the electrical power of the fan and a flow parameter of the fan unit, particularly the pressure difference between an inlet pressure and an outlet pressure of the fan unit. The inlet pressure is determined upstream of the fan unit in the inflow channel and the outlet pressure of the fan unit is determined downstream in the outflow channel. Also a volume or mass flow rate of the airflow through the fan unit can be used as flow parameter. The power characteristic curve is particularly determined by means of measurement and/or simulation for the fan unit—including the fan and the at least one filter—and stored, e.g. in a memory of the fan control or in an external computing unit that is communicatively connected with the fan control. For the different speeds respectively one power characteristic curve can be determined and stored. Thus, a characteristic map of multiple stored power characteristic curves can be available.

By means of the fan, an airflow along the flow path and thereby through the at least one filter is created. The speed with which the fan is operated is known and can be controlled in a closed loop or open loop manner. The desired speed can be predefined by means of the fan control and/or the external computing unit. The current speed of the fan can be detected by means of a speed sensor and can be provided to the fan control and/or the external computing unit. Alternatively, instead of the current speed also the desired speed can be used under the assumption that the current speed is at least substantially equal to the desired speed.

The electrical power of the fan is the electrical power consumed by the electric motor of the fan. Particularly the motor current and the motor voltage are determined for this purpose and the electrical power is calculated therefrom. The motor current and/or the motor voltage can be measured. The motor voltage can be set to a constant value so that a measurement can be omitted.

Based on the current speed or desired speed, a stored power characteristic curve can be selected. Thereby the power characteristic curve is selected in which the difference between the current speed or desired speed is minimum compared with the speed assigned to the stored power characteristic curve. As an option, a power characteristic curve can also be calculated based on a reference characteristic curve by using affinity laws.

The at least one power characteristic curve of the fan unit has an ambiguous power value range. Within this ambiguous power value range two possible flow parameter values are assigned to one power value. Therefore, within this ambiguous power value range it cannot be unambiguously determined based on one single current power value at which operating point the fan unit operates. Outside of the ambiguous power value range the power characteristic curve can have a range in which exactly one flow parameter value is assigned to each current power value.

For determination of a current operating point at least the current power value for the electrical power of the fan is determined in therefrom at least in the unambiguous power value range of the selected power characteristic curve the current flow parameter value (e.g. pressure difference value) can be determined.

According to the present disclosure in addition to the current power value defining a second power value at a second point in time, at least one power value at at least one preceding point in time can be determined and considered defining a first power value to a first point in time. This is at least necessary in the case where the second power value is within the ambiguous power value range and the current operating point shall be determined. Thereby the current operating point can be unambiguously determined, also inside the ambiguous power value range. For example, it can be assumed that the operating point of the fan unit changes due to a modification of the at least one filter with increasing operating time and that the at least one filter is increasingly contaminated during the operating time. The flow parameter value can only increase or only decrease due to this increasing pollution, depending on which physical parameter is used as flow parameter. For example, the pressure difference between the inlet pressure and the outlet pressure of the fan unit can only increase with increasing pollution and the volume or mass flow rate through the ventilator unit can only decrease. Two power values determined with time lag are therefore sufficient in order to unambiguously determine the current operating point.

Additionally or alternatively, also three or more power values can be determined in a time sequence so that the current operating point can be determined based on the two or more preceding power values.

The operating point and the resulting flow parameter value (e.g. the resulting pressure difference between the inlet pressure and the outlet pressure) are also characteristic for the flow resistance of an airflow along a flow path and through the fan unit. Therefore, for example, based on the current operating point the condition of the filter can be concluded and suitable measures can be initiated. For example, information can be created and output that indicates whether the filter has to be cleaned or exchanged. Thereby qualitative and/or quantitative indications about the condition of the filter can be made. For example, the filter condition can be divided in multiple stages and the stages of the filter condition can be output. One stage of a filter condition can thereby correspond to a good filter condition, for example, while another stage requires the immediate exchange of the filter. One stage or condition can also indicate a non-present or non-installed filter.

By means of the present disclosure, a very precise determination of the current operating point can be realized. The power characteristic curve of the fan unit distinguishes particularly from the fan characteristic curve of the fan. Particularly, in case of a backward curved centrifugal fan the progress of the fan characteristic curve is very flat in the range of a maximum over a large value range of the flow parameter, so that within this value range of the flow parameter the electrical power cannot be assigned with sufficient reliability or accuracy to one flow parameter value. On the contrary, the power characteristic curve of the fan unit is less wide in the range of the maximum and the assignment between one electrical power and one flow parameter value is also possible with sufficient accuracy in the range of the maximum.

The determination of a mechanical power of the fan is omitted. The power value for the electrical power of the fan (consumed electrical power of the electric motor) can be determined very precisely and very simply, e.g. in that the motor current and/or the motor voltage is measured or is determined otherwise. From the power value a flow parameter value of the fan unit (pressure difference value, volume flow rate value, etc.) and thus the current operating point can be directly determined based on the selected power characteristic curve. If a characteristic map consisting of a multiplicity of power characteristic curves for different speeds of the fan is stored, a calculation of a power characteristic curve from a reference characteristic curve for a current speed by using affinity laws can be omitted, which results in a reduced computing effort on one hand and increases the accuracy for the determination of the current operating point on the other hand.

It is advantageous, if the speed of the fan is closed loop controlled so that the speed is known with high accuracy and the assigned power characteristic curve can be selected or alternatively calculated.

For example, the present disclosure can be used in order to determine the condition of the at least one filter, e.g. in that the current operating point is compared with a former operating point and therefrom an increasing pollution of the filter can be concluded. This is particularly possible, if the pollution of the filter is the crucial factor for an increasing flow resistance of the airflow through the fan unit. This can be assumed in many cases.

It is advantageous, if the determination of the current operating point of the fan unit is carried out always dependent from the first power value, the second power value and the selected or determined power characteristic curve, independent from whether the second power value is inside or outside the ambiguous power value range. In this embodiment of the method a distinction of cases is not required.

Alternatively thereto, a distinction of cases can be made. If the second power value is outside the ambiguous power value range, the determination of the current operating point of the fan can be carried out independent from the first power value. The operating point then results from the current second power value and the power characteristic curve.

The power characteristic curve of the fan unit has a maximum inside the ambiguous power value range and thus a section with positive gradient and a section with negative gradient. If a pressure difference is used as flow parameter, the power of the fan unit increases with increasing pressure difference in the section with positive gradient and in the section with negative gradient the power of the fan unit decreases with increasing pressure difference.

The flow parameter value of the fan unit can alternatively or additionally depend on additional parameters that influence the flow resistance of the airflow, e.g. from opening and/or closing of flaps inside the flow path of the gas flow. Such variations of the flow parameter are carried out remarkably quicker in time and can therefore be distinguished from slower parameter changes, due to an increasing filter clogging, e.g. by consideration of the time gradient of the flow parameter.

It is in addition advantageous, if during determination of the current operating point the speed of the fan is considered. Particularly, the power characteristic curve used for determination of the operating point can depend on the speed and can be either calculated depending on the speed or selected from a characteristic map.

For example, a power characteristic curve that is to be used can be calculated from the speed and a known predefined reference characteristic curve. The reference characteristic curve can be determined empirically in the context of the development or can be recorded during launch of the fan at a reference speed. The current power characteristic curve can then be determined based on the following equations (affinity laws):

$$\frac{P1}{P2} = \left(\frac{n1}{n2}\right)^3 \tag{1}$$

$$\frac{dp1}{dp2} = \left(\frac{n1}{n2}\right)^2 \tag{2}$$

It is advantageous, if the fan of the fan unit is speed-controlled in open loop or closed loop manner. Particularly, a constant desired speed can be predefined as control variable. The speed of the fan is thus stationary or at least quasi stationary during operation.

It is in addition advantageous, if the fan unit is communicatively connected with an external computing unit. The determination of the current operating point and/or the determination of the condition of the filter and/or the setting of another, new operating point can be carried out by means of the external computing unit. The external computing unit can be arranged at a location remote from the fan unit and can communicate with the fan unit via an internet connection, for example. The external computing unit can be a cloud computing unit. The external computing unit can be communicatively connected with multiple fan units.

A fan system according to the present disclosure can comprise at least one fan unit and an external computing unit. If multiple fan units are present, they can be communicatively connected via a communication network with a common modem or another communication interface. The communication network can be a bus system. The bus system can have any known architecture or can correspond to any known standard, e.g. a field bus standard such as PROFIBUS or MODBUS.

The modem or the communication interface can be configured for communication with the external computing unit, wherein the communication connection between the modem and the external computing unit can be realized, for example, via a LAN-connection, a WLAN-connection, an Ethernet-connection, a GSM-connection, an arbitrary combination thereof or any other internet connection.

Advantageous embodiments of the invention are derived from the dependent claims, the description and the drawing.

BRIEF DESCRIPTION OF THE DRAWINGS

In the following preferred embodiments of the invention are described in detail based on the attached drawing. The drawings show.

DETAILED DESCRIPTION

Figure 1:
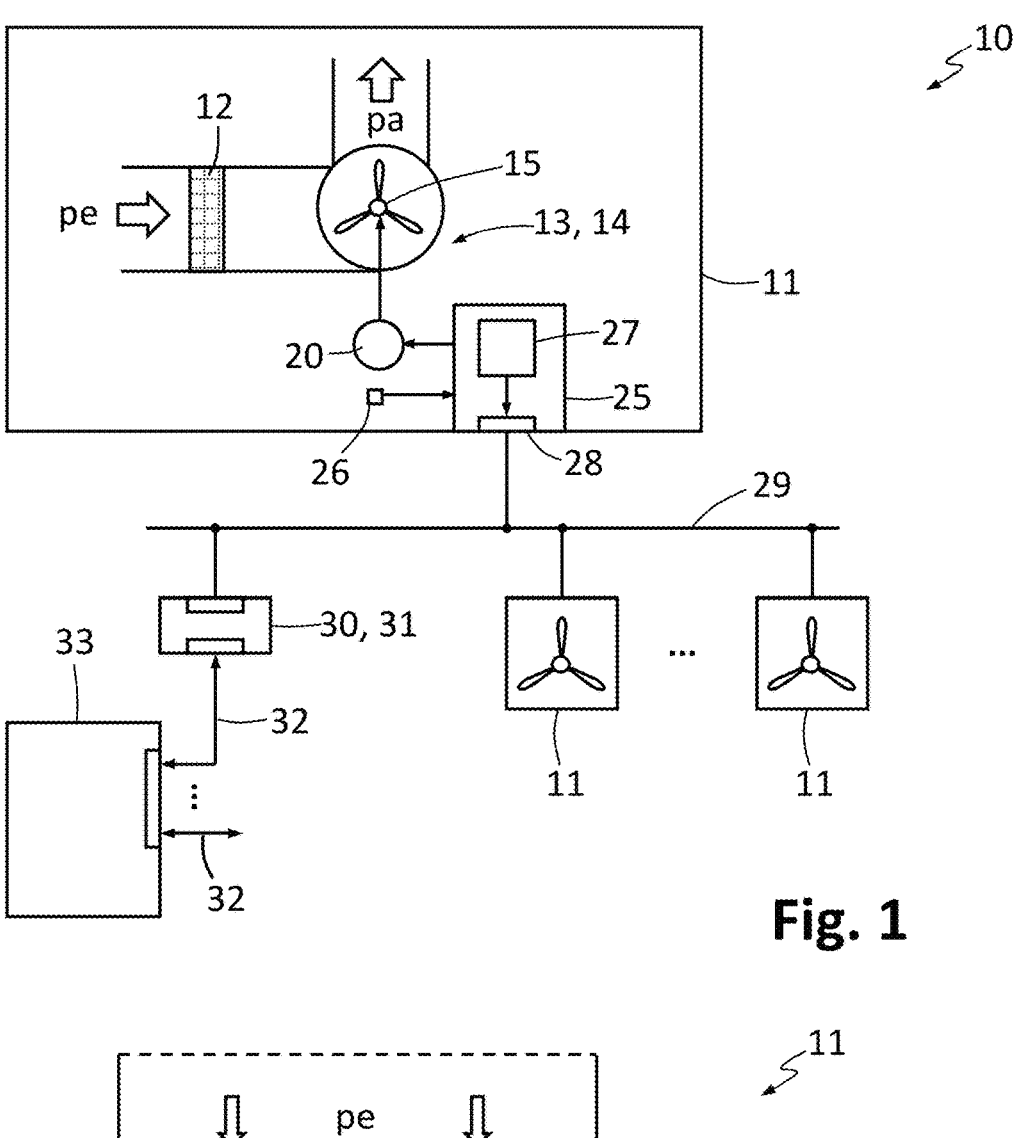
FIG. 1 a schematic block diagram like illustration of an embodiment of a fan system, FIG. 2 a schematic block diagram like illustration of an embodiment of a fan unit of the fan system of FIG. 1, FIG. 3 a schematic illustration of a characteristic map having multiple characteristic curves of a fan unit according to FIG. 2 and of a fan characteristic curve for comparison, FIGS. 4 and 5 a schematic illustration of a power characteristic curve respectively for illustration purposes of the method and for determination of a current operating point based on the power characteristic curve.

In FIG. 1 a block diagram of an embodiment of a fan system 10 is illustrated. The fan system 10 comprises at least one fan unit 11. The fan unit 11 comprises at least one filter 12 and a fan 13. The fan 13 is configured to create an airflow through the at least one filter 12. The at least one filter 12 can be arranged upstream or downstream of fan 13.

According to the example, the fan 13 is a backward curved centrifugal fan 14. The centrifugal fan 14 has a fan impeller 15 that is rotatably supported around a rotation axis D. On the fan impeller 15 multiple fan blades 16 are distributed around the rotation axis D in circumferential direction. Each fan blade 16 is arranged with distance to the rotation axis D and has a radial inboard inner edge as well as a radial outboard outer edge. In rotation direction around the rotation axis D the outer edge is arranged behind the inner edge of the fan blade 16. Each fan blade 16 is therefore backwardly curved from the inner edge to the outer edge in rotation direction. An embodiment of a backward curved centrifugal fan 14 is highly schematically illustrated in FIG. 2.

Figure 2:
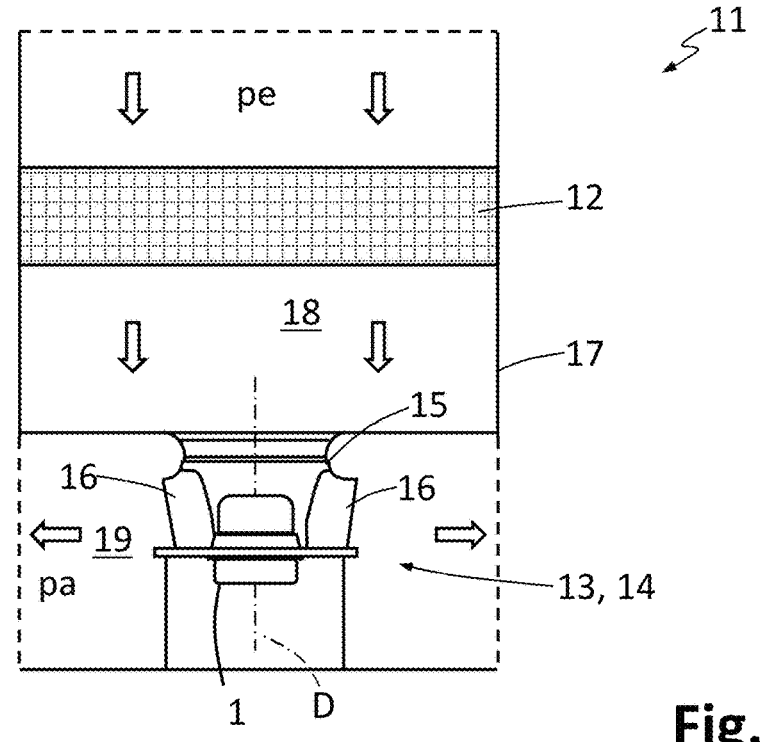

In FIG. 2 an embodiment for a fan unit 11 is illustrated. In the embodiment fan unit 11 comprises a housing 17 that limits an inflow channel 18 as well as an outflow channel 19. The inflow channel 18 is provided upstream of fan 13 and according to the example of centrifugal fan 14 and substantially orientated parallel to the rotation axis D of fan 13. For the centrifugal fan 14 illustrated here the outflow channel 19 is orientated radially to the rotation axis D. According to the example, one single filter 12 is arranged in the inflow channel 18. In modification to the illustrated embodiment also multiple filters 12 can be arranged inside inflow channel 18 and/or outflow channel 19.

At the inlet of fan unit 11 an inlet pressure pe is present and at the outlet of fan unit 11 an outlet pressure pa is present. Between the locations at which the inlet pressure pe and the outlet pressure pa are present the at least one filter 12 and the fan 13 of fan unit 11 are arranged inside the flow path.

For rotatingly driving the fan impeller 15 around the rotation axis D, fan 13 comprises an electric motor 20. The electric motor 20 is preferably a brushless DC motor that can also be denoted as electronically commutated DC motor excited by permanent magnets. The brushless DC motor is only subject to low wear and can be very well speed controlled. In addition, high energy efficiency can be achieved with the brushless DC motor.

The fan system 10 comprises a fan control 25 for open loop control or closed loop control of fan 13 and thus of electric motor 20. The fan control is particularly configured to control the speed of the rotor of the electric motor 20 in open loop or closed loop manner. In the embodiment the fan impeller 15 is connected with the rotor of the electric motor 20 in a torque-proof manner so that the speed of the rotor of the electric motor 20 is equal to the speed of the fan impeller, which can be commonly denoted also as speed of the fan 13.

In the illustrated embodiment the speed of fan 13 is preferably closed loop controlled. By means of a speed sensor 26, the speed of the rotor of the electric motor 20 and/or the fan impeller 15 is detected and provided to the fan control 25. For this the speed sensor 26 is communicatively connected with fan control 25. In addition to the speed sensor 26, also at least one additional sensor can be present in order to detect at least one additional operating parameter of the electric motor 20. For example, a current sensor for measurement of the motor current and/or a voltage sensor for measurement of the motor voltage can be present.

If fan 13 is speed-controlled in a closed loop manner, the speed sensor 26 can also be omitted as an option and it can be assumed that the current speed of fan 13 is equal to the preset desired speed with sufficient accuracy. Instead of the detected current speed then the desired speed can be used for determination of the current operating point A of fan unit 11. The method for determination of the current operating point A of fan unit 11 is explained in more detail in the following.

The fan control 25 comprises in addition a memory 27. In memory 27 information can be stored, provided for transmission or for access. In memory 27 such information or data can comprise current operating parameters, such as the current speed, or non-variable data can be stored, such as one or more power characteristic curves of fan unit 11.

The fan control 25 comprises an interface 28 via which the fan unit 11 can be connected to a communication network 29. The communication network 29 is preferably a bus system, e.g. the field bus system that can correspond to a known standard, for example, such as MODBUS or PROFIBUS. The communication network 29 can be wired and/or wireless.

Multiple individual fan units 11 can be connected to communication network 29. Via communication network 29 each fan unit 11 is communicatively connected with a communication module 30, e.g. a modem 31. The communication module 30 forms an interface between the communication network 29 on one hand and a network connection 32 comprising an external computing unit 33 on the other hand. For example, the network connection can be established as LAN-connection, WLAN-connection, GSM-connection or in any other known manner. The external computing unit 33 can be part of a cloud system and thus can form a cloud computing unit.

The fan system 10 is configured to determine the current operating point A of one, multiple or all of the fan units 11 based on a method according to the present disclosure. The determination of the current operating point A of a fan unit 11 or the determination of the condition of filter 12 of this fan unit 11 is carried out by means of the external computing unit 33 according to the example. The computing power required for this purpose can be provided by the external computing unit 33. The data and information required for the determination of the current operating point A can be provided or stored decentrally in the memory 27 and/or centrally in the external computing unit 33. The external computing unit 33 can thus manage and/or control the fan system 10 centrally. For example, by means of the external computing unit 33, specification for control in open loop or closed loop manner for each fan unit 11 of a fan system 10 can be transmitted to the respective fan control 25, such as a desired value that is to be adjusted, e.g. the desired speed of the fan 13 of the fan unit 11.

The external computing unit 33 can be communicatively connected via the network connection 32, also with multiple communication modules 30 that in turn are connected via one communication network 29 respectively with at least one fan unit 11. In other words the external computing unit 33 can also be part of multiple separate fan systems 10.

During operation of fan unit 11 particles comprised in the air are filtered out of the airflow by means of the at least one filter 12. The load of filter 12 with particles therefore increases with increasing operating duration of fan unit 11 and its ability to allow a preset air volume flow rate or air mass flow rate through the fan unit 11 decreases. Based on the determination of the current operating point A of fan unit 11, also the condition of filter 12 can be determined, for example, so that information is present whether or when filter 12 has to be cleaned or exchanged.

Figure 3:
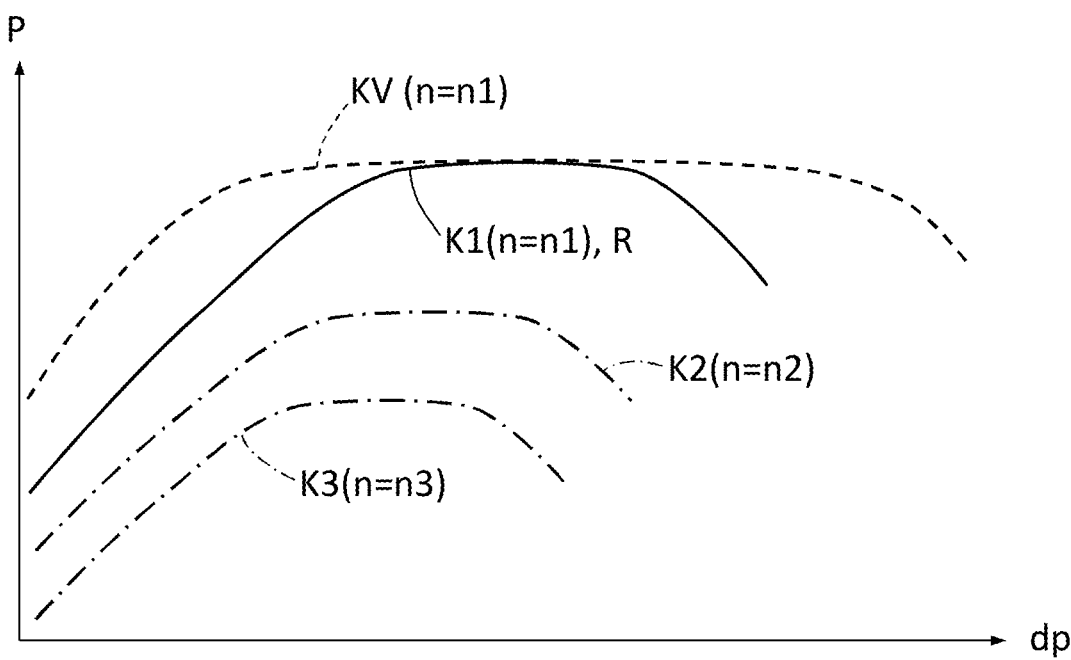

In FIG. 3 an embodiment of a characterizing map having multiple characteristic curves K1, K2, K3 of fan unit 11, according to FIGS. 1 and 2, is illustrated schematically. By way of example, three characteristic curves K1, K2, K3 are shown, wherein each of the characteristic curves K1, K2, K3 is assigned to one speed n1, n2, n3 of fan 13. This means each characteristic curve K1, K2, K3 is valid for the assigned speed of fan 13 and describes the correlation between the electrical power P of fan 13 and a flow parameter of the entire fan unit 11 at this speed n1, n2, n3.

For example, a pressure difference dp or alternatively also another flow parameter characterizing the flow resistance along the flow path can be used as flow parameter, such as a volume flow rate or a mass flow rate through the fan unit. According to the example, each power characteristic curve K1, K2, K3 describes the correlation between the electrical power P of fan 13 and a pressure difference dp at a predefined speed n1, n2, n3 of fan 13. The pressure difference dp corresponds to the difference between the inlet pressure pe and the outlet pressure pa of fan unit 11. The pressure difference dp thus depends from the operating condition of fan 13 on one hand and from the condition of filter 12 and particularly its load with particles filtered out of the air on the other hand. The larger the load or contamination of filter 12, the higher the pressure difference dp.

For the method a characterizing map of multiple power characteristic curves K1, K2, K3 for the different speeds n1, n2, n3 of fan impeller 15 or fan 13 can be stored in the external computing unit 33 or in memory 27. It is also possible to determine and store a reference characteristic curve R at a preset reference speed for each type of fan 13. The reference characteristic curve R and/or the characteristic map of multiple characteristic curves K1, K2, K3 can be determined empirically and/or by simulation, particularly in a laboratory or at the manufacturer or in the context of the launch of fan unit 11 at the installation site.

If fan 13 is operated at a speed different from the reference speed assigned to the reference characteristic curve R or at a speed that does not correspond to any of the stored characteristic curves K1, K2, K3 of the characteristic map, a currently required power characteristic curve K can be determined for the current speed based on the following equations (affinity laws):

$$\frac{P1}{P2} = \left(\frac{n1}{n2}\right)^3 \tag{1}$$

$$\frac{dp1}{dp2} = \left(\frac{n1}{n2}\right)^2 \tag{2}$$

Therefore, for each current speed of fan 13 either a sufficiently precise power characteristic curve K1, K2, K3 is available for being selected from a stored characteristic map or a current power characteristic curve can be calculated based on the equations (1) and (2).

Figure 4:
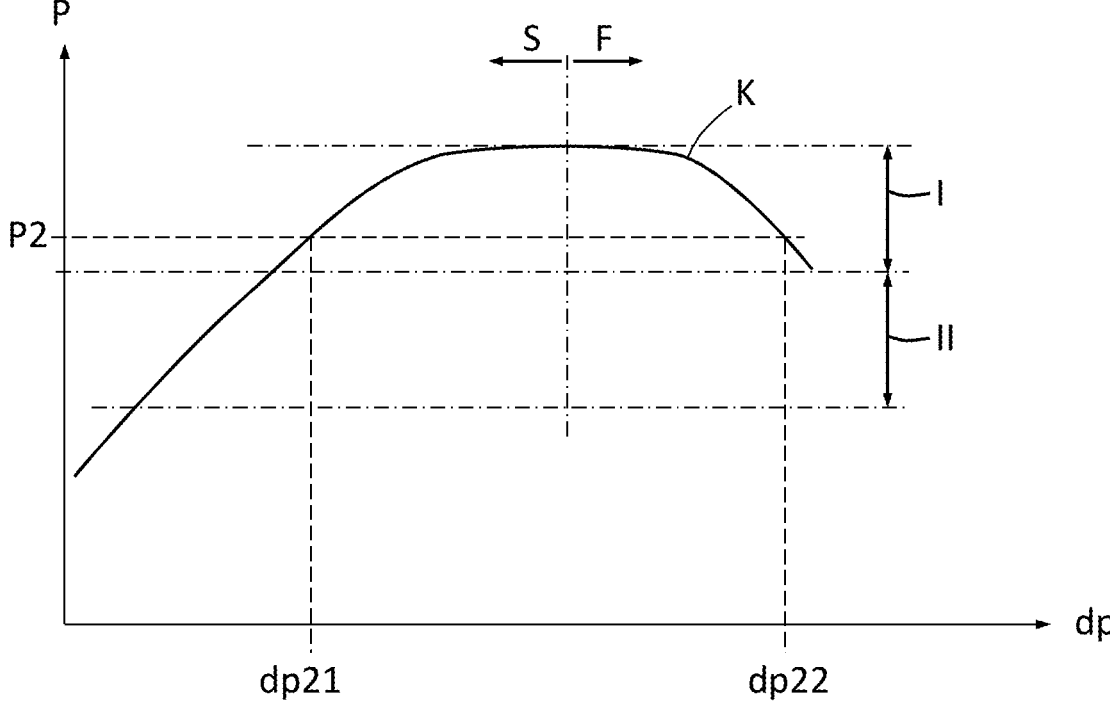

As illustrated in FIG. 4, each power characteristic curve K has an ambiguous power value range I and according to the example, an unambiguous power value range II. In the ambiguous power value range I two pressure difference values are assigned to each power value of the electrical power P of fan 13 or electric motor 20. Therefore, if a current power value for the consumed electrical power P of fan 13 is determined, the current operating point A of fan unit 11 cannot be determined based on this power value, if the current determined power value is inside the ambiguous power value range I. If however the current determined power value is inside the unambiguous power value range II, the current operating point A of fan unit 11 already results from the currently determined power value and the power characteristic curve of fan unit 11.

In order to be able to unambiguously determine the operating point A also for power values located inside the ambiguous power value range I, it is proceeded as follows:

At a first point in time a first power value P1 of the consumed electrical power of fan 13 is determined. For example, the motor current and/or the motor voltage of electric motor 20 and/or parameters correlated therewith can be measured or calculated for this purpose. At a second point in time, having a sufficient time lag to the first point in time, a second power value P2 of power P is determined. The second power value P2 can be a current power value to which the current operating point A of fan unit 11 shall be determined. The first power value P1 corresponds to the power of fan 13 to an earlier point in time, e.g. a point in time of the directly preceding determination. It is preferred, if the power value is determined in a time or event-triggered manner, e.g. in a predefined time interval. The last determined power value can be the second power value P2 and the power value determined preferably during the directly preceding determination can be the first power value P1. In modification to the embodiment described here, also more than two power values can be determined in a time sequence, whereby the latest determined power value defines the current power value that characterizes the current operating point of fan unit 11.

Figure 5:
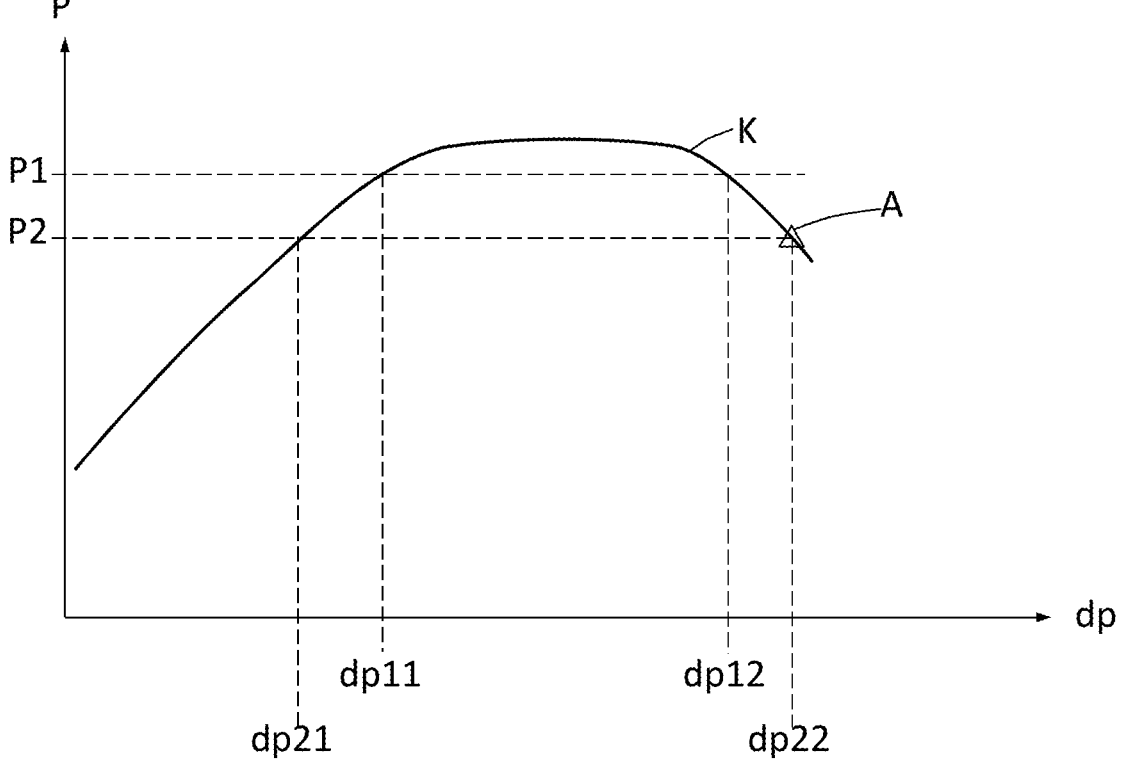

As apparent from FIGS. 3-5, the power characteristic curve K has a maximum that separates a section with positive gradient S and a section with negative gradient F from one another (FIG. 4). In the section having a positive gradient S the power P increases with increasing pressure difference dp. In the section having a negative gradient F, the power P decreases with increasing pressure difference dp.

It is assumed that at the second point in time a second power value P2 is determined located inside the ambiguous power value range. As illustrated in FIG. 3, the power characteristic curve K assigns a lower pressure difference value dp21 and an upper pressure difference value dp22 to the second power value P2 at the current speed of fan 13. Solely based on the determination of the current power value, the second power value P2 in the present case, therefore no operating point A of fan unit 11 can be determined.

For this reason a first power value P1 determined at a previous first point in time is additionally considered. The power characteristic curve K assigns a lower pressure difference value dp11 and an upper pressure difference value dp12 to this first power value P1, as schematically illustrated in FIG. 5.

In the embodiment of fan unit 11, schematically illustrated in FIG. 2, it can be assumed that the flow resistance in the flow path, i.e. inside inflow channel and outflow channel of fan unit 11, is exclusively or substantially influenced by accumulation of particles in filter 12, which in turn characterizes the flow parameter and according to the example the pressure difference dp during operation of the fan unit 11. For this reason it can be assumed that the pressure difference dp increases and does not decrease, due to the increasing pollution of filter 12 over time. With this knowledge it is sufficient to use two power values P1, P2 in order to determine the current operating point A based on the selected power characteristic curve K. Also more than two power values can be determined in a time sequence in order to recognize therefrom the current operating point A.

In the present case it can also be assumed that the pressure difference of the current operating point A assigned to the second power value P2 of the electrical power is larger than the pressure difference dp assigned to the first power value P1. In the example illustrated in FIGS. 4 and 5 the current operating point A is therefore located in the section F with negative gradient. Therefore, it can be determined based on the power characteristic curve K, the first power value P1 and the second power value P2 that the current operating point A corresponds to the value pair of the second power value P2 and the upper pressure difference value dp22 for the second power value P2. The current operating point A is illustrated in FIG. 5 by the triangle.

If at a second point in time the current second power value P2 should be inside an unambiguous power value range II, the second power value P2 and the power characteristic curve K are sufficient for determination of the current operating point A.

Due to the determination of the current operating point A, therefore, the current pressure difference can be determined that corresponds to the upper pressure difference value dp22 for the second power value P2 in the example illustrated in FIG. 5. The pressure difference dp is dependent from the load of filter 12 with particles, so that therefrom the condition of filter 12 can be derived.

Based thereon it is possible to determine the condition of filter 12 quantitatively and/or qualitatively and to create respective information that can be output for an operator. For example, condition stages can be formed, whereby the number of condition stages can vary. The filter condition can be characterized as "good", "critical but acceptable" and "clogged", for example in three stages. Therefrom a recommendation for action can be derived, e.g. the cleaning or exchange of the filter.

If in the fan unit or in the flow path of the airflow additional devices are present that influence the flow resistance, their actual position can also be determined based on the method described above. If for example a flap or choke in the flow path is opened or closed, the pressure difference dp changes very quickly. If the detection of the power values for the electrical power P is carried out sufficiently frequently, such changes can be determined. Based on the time-dependent change of the pressure difference, i.e. based on the pressure difference gradient, the increase or decrease of the flow cross-section of the flow path of the airflow, due to the actuation of components that are provided there, can be distinguished from a comparatively slower continuous pressure difference increase due to an increasing clogging of the filter. Flow cross-section changes based on an actuation of a flap, a choke or the like can thus also be determined and indicated, if required.

In addition, it is possible to recognize, based on the at least one stored power characteristic curve, if the fan unit 11 does unintentionally contain no filter insert in the holder of filter 12 or the filter 12 has been completely omitted. Then the current values for the electrical power and the flow parameter are located outside of the at least one stored power characteristic curve.

In the present disclosure the power characteristic curve or characteristic map of multiple power characteristic curves K1, K2, K3 of fan unit 11 consisting of fan 13 and at least one filter 12 is stored in memory 27 or in the external computing unit 33. For example, the at least one power characteristic curve K1, K2, K3 can be determined by the manufacturer in a test laboratory or during installation on site by measurements and/or by simulation and assigned to the fan unit 11. Fan units 11 that are identically configured have identical power characteristic curves.

The detection and use of power characteristic curves K (K1, K2, K3, . . . ) of fan unit 11 during determination of the current operating point A is advantageous compared with the use of the fan characteristic curve KV of fan 13 that the assignment of a determined power value of the electrical power P to a flow parameter value in the range of the maximum of the characteristic curve is sufficiently precise or reliable, particularly also for a backward curved centrifugal fan 14. For comparison the fan characteristic curve KV of a backward curved centrifugal fan 14 at a first speed n1 is illustrated in dashed lines in FIG. 3. It is apparent that the fan characteristic curve KV comprises in the region of the maximum a flat section that extends over a larger pressure difference range compared with the power characteristic curve K1 of fan unit 11. The sufficient reliability of the assignment of one power value to one pressure difference is not always provided when using the fan characteristic curve KV. Indeed, if backward curved centrifugal fans 14 are used, the use of a power characteristic curve K for the entire fan unit 11 provides a remarkable advantage.

The present disclosure refers to a method and a fan system that is configured for carrying out the method. The method serves for determination of a current operating point of a fan unit 11 comprising a fan 13 and at least one filter 12. Due to the determination of the current operating point A, also the degree of contamination of filter 12 can be concluded, for example. It can also be recognized whether filter 12 is present or not. A power value for the electrical power of fan 13 can be determined at one or multiple points in time. Dependent from the current speed of fan 13, a power characteristic curve K can be selected from a characteristic map or can be calculated based on a reference characteristic curve R that characterizes the correlation between an electrical power of fan 13 and a flow parameter of fan unit 11. The power characteristic curve K thus does not relate only to the fan 13, but to the entire fan unit 11. For this reason an unambiguous and sufficiently precise determination of the current operating point A of fan unit 11 is possible.

LIST OF REFERENCE SIGNS

10 fan system
11 fan unit
12 filter
13 fan
14 backward curved centrifugal fan
15 fan impeller
16 fan blade
17 housing
18 inflow channel
19 outflow channel
20 electric motor
25 fan control
26 speed sensor
27 memory
28 interface
29 communication network
30 communication module
31 modem
32 network connection
33 external computing unit
I ambiguous power value range
II unambiguous power value range
A operating point
D rotation axis
dp pressure difference
dp11 lower pressure difference value for first power value
dp12 upper pressure difference value for first power value
dp21 lower pressure difference value for second power value
dp22 upper pressure difference value for second power value
F section with negative gradient
K power characteristic curve
K1 first characteristic curve
K2 second characteristic curve
K3 third characteristic curve
KV fan characteristic curve
N speed
n1 first speed
n2 second speed
n3 third speed
P power
P1 first power value
P2 second power value
Pa outlet pressure
Pe inlet pressure
R reference characteristic curve
S section with positive gradient

The invention claimed is:

1. A method for determination of an operating point of a condition of a fan unit that comprises at least one filter and a fan, wherein the method comprises the following steps:

creation of an airflow through the at least one filter by means of the fan, determination of one power value of electrical power of the fan at at least one point of time, determination or selection of a power characteristic curve of the fan unit, wherein the power characteristic curve characterizes a correlation between the electrical power of the fan and a flow parameter of the fan unit, wherein the power characteristic curve comprises a power value range in which two possible flow parameter values are assigned to the one power value of electrical power of the fan, and determination of a current operating point of the fan unit at least in the power value range depending on a first power value of electrical power of the fan at a first point in time, a second power value of electrical power of the fan at a second point in time and the power characteristic curve, wherein the flow parameter is one of a pressure difference between an inlet pressure and an outlet pressure of the fan unit and a volume or mass flow rate through the fan unit and the current operating point is determined under the assumption that the pressure difference increases and does not decrease over time, due to increasing pollution of the at least one filter;

wherein the determined current operating point is indicative of a condition of the at least one filter;

and wherein action regarding the at least one filter including one or more of cleaning or replacing the at least one filter is taken as a result of the determined current operating point.

2. The method according to claim 1, wherein the determination of the current operating point of the fan unit is always carried out depending on the first power value of the electrical power of the fan, the second power value of the electrical power of the fan and the power characteristic curve of the fan unit, independent from whether the second power value is inside or outside the power value range.

3. The method according to claim 1, wherein only the first current power value of the electrical power of the fan is used as the one power value for the determination of the current operating point of the fan unit, if the second power value is inside an unambiguous power value range outside of the power value range.

4. The method according to claim 1, wherein the fan is a backward curved centrifugal fan.

5. The method according to claim 1, wherein a speed of the fan is considered for determination of the current operating point.

6. The method according to claim 5, wherein the power characteristic curve is selected from a characteristic map of power characteristic curves based on the speed of the fan.

7. The method according to claim 5, wherein the power characteristic curve is calculated based on the speed of the fan and a predefined reference characteristic curve or a selected power characteristic curve, wherein the predefined reference characteristic curve characterizes a correlation between the power of the fan and the flow parameter of the fan unit for a reference speed of the fan.

8. The method according to claim 1, wherein a constant desired speed is provided to the fan unit as control variable.

9. The method according to claim 1, wherein the fan unit is communicatively connected with an external computing unit and wherein the external computing unit is configured to determine the current operating point and/or to specify another operating point.

10. The method according to claim 2, wherein only the first current power value of the electrical power of the fan is used as the one power value for the determination of the current operating point of the fan unit, if the second power value is inside an unambiguous power value range outside of the power value range.

11. The method according to claim 10, wherein the fan is a backward curved centrifugal fan.

12. The method according to claim 11, wherein a speed of the fan is considered for determination of the current operating point.

13. The method according to claim 12, wherein the power characteristic curve is selected from a characteristic map of power characteristic curves based on the speed of the fan.

14. A fan system comprising at least one fan unit and an external computing unit that is communicatively connected with the at least one fan unit that comprises at least one filter and a fan, wherein the fan system is configured to carry out a method for determination of a condition of the at least one fan unit, wherein the method comprises the following steps:

creation of an airflow through the at least one filter by means of the fan, determination of one power value of electrical power of the fan at at least one point of time respectively, determination or selection of a power characteristic curve of the fan unit, wherein the power characteristic curve characterizes a correlation between the electrical power of the fan and a flow parameter of the fan unit, wherein the power characteristic curve comprises an power value range in which two possible flow parameter values are assigned to the one power value of the electrical power of the fan, and determination of a current operating point of the fan unit at least in the power value range depending on a first power value of electrical power of the fan at a first point in time, a second power value of electrical power of the fan at a second point in time and the power characteristic curve, wherein the flow parameter is one of a pressure difference between an inlet pressure and an outlet pressure of the fan unit and a volume or mass flow rate through the fan unit and the current operating point is determined under the assumption that the pressure difference increases and does not decrease over time, due to increasing pollution of the at least one filter;

wherein the determined current operating point is indicative of a condition of the at least one filter;

and wherein action regarding the at least one filter including one or more of cleaning or replacing the at least one filter is taken as a result of the determined current operating point.

15. The fan system according to claim 14, wherein the at least one fan unit comprises a fan control that is communicatively connected with a modem via a communication network.

16. The fan system according to claim 15, wherein the modem is communicatively connected with the external computing unit.

17. The fan system according to claim 14, wherein the fan is a backward curved centrifugal fan.

18. The fan system according to claim 14, wherein the fan comprises a fan impeller and a brushless electric motor that is configured for rotation of the fan impeller.

* * * * *